United States Patent Office 3,160,666
Patented Dec. 8, 1964

3,160,666
VINYLPHOSPHORUS COMPOUNDS AND
METHOD OF PREPARATION
Hugh E. Ramsden, Scotch Plains, N.J., assignor to Metal &
Thermit Corporation, Woodbridge Township, N.J., a
corporation of New Jersey
No Drawing. Filed July 12, 1957, Ser. No. 671,371
14 Claims. (Cl. 260—606.5)

The present invention relates to novel vinylicphosphorus compounds, and to a process for preparing the same. It has now been discovered that novel vinylicphosphorus compounds can be prepared by a novel, efficient and economical process.

It is an object of the present invention to provide novel vinylicphosphorus compounds.

It is also an object of this invention to provide a novel process for preparing vinylicphosphorus compounds.

Generally speaking, the present invention embodies novel vinyl phosphorus compounds having the general formula:

(1)     $Vi_nR_aR'_bPX_{3-(n+a+b)}$ wherein $n=1, 2$ or $3$; $a$ and $b=0$ or $1$; $n+a+b$ may not total more than 3; Vi is a vinylic radical; R and R' may be the same or different and are selected from the group consisting of alkyl, cycloalkyl, alkandiyl, cycloalkandiyl, alkenyl, alkadienyl, cycloalkenyl, alkynyl, cycloalkadienyl, aryl, aralkyl, and active-hydrogen-free heterocyclic radicals, and X is selected from the group consisting of iodine, bromine, chlorine, and fluorine, alkoxy and aryloxy radicals. Two or more R groups may be cyclized. The aryl radicals include fused ring and condensed radicals. The term "vinylic radical" (Vi) is used herein to denote structures of the type:

(2) 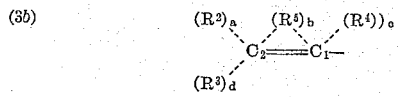

where the No. 1 carbon is bonded to phosphorus, R", R''' and R'''' may be hydrogen and are further defined as in R above. The hydrocarbon radicals may be unsubstituted or carry functional groups inert to magnesium or vinylic magnesium chlorides under reaction conditions. The vinylic radical also includes cycloalkenyl having the following general type structure:

(3) 

where $l$ is a whole number greater than 1. By the term "active-hydrogen-free heterocyclic radical," all heterocyclic radicals except those containing hydrogen attached to nitrogen or oxygen, or containing other groups reactive with the organic magnesium chlorides, are included.

More specifically compounds encompassed by the present invention may be described by the general formula (3a)     $Vi_nR_aR'_bPX_{3-(n+a+b)}$ wherein $n$ is a whole number from 1 to 3, $a$ and $b$ are whole numbers from 0 to 2, wherein the sum of $n+a+b$ does not exceed 3; X is a halogen selected from the class consisting of iodine, bromine, chlorine and fluorine and alkoxy radical having up to 30 carbon atoms in the alkyl chain and an aryloxy radical having up to 3 rings in the aryl radical; R is a radical selected from the class consisting of alkyl having up to 30 carbon atoms in the alkyl chain, aryl radical having up to 3 rings in the aryl radical and no more than 48 carbon atoms in the radical, cycloalkyl radicals having up to 8 carbon atoms in the cycloalkyl ring, heterocyclic radicals containing up to 3 rings in the radical and no more than 48 carbon atoms in the radical and containing as the heterocyclic atoms only elements selected from the class consisting of oxygen, sulfur and nitrogen; R' has the same values ascribed above for R with the further stipulation that it may comprise a divalent aliphatic hydrocarbon radical, containing no more than 6 carbon atoms in the chain, each valence of which is bonded to P; and Vi is a vinylic radical having from 2 to 30 carbon atoms in the radicals and having the following structural formula (3b) 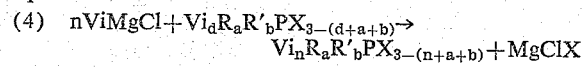

wherein no more than 2 valence bonds indicated by the dotted lines in the above formula are bonded to the $C_2$ atom, and no more than 1 valence bond indicated by the dotted line in said formula may be bonded to the $C_1$ atom, wherein $R^2$, $R^3$ and $R^4$ are monovalent hydrocarbon groups having up to 28 carbon atoms, and $R^5$ is a divalent saturated aliphatic hydrocarbon radical having up to 8 carbon atoms in the chain, and $a$, $b$, $c$ and $d$ are whole numbers from zero to 1, wherein the sum of $a+b+c+d$ is a whole number from 2 to 3, and wherein when $b$ equals zero the sum of $a+c+d$ equals 3, and wherein when $b$ equals 1 the sum of $a+b+c+d$ equals 2, and wherein when any of the subscripts $a$, $c$ and $d$ are zero a hydrogen replaces the corresponding radical in the formula.

The process for producing the novel vinylic compounds comprises reacting a vinylicmagnesium chloride with a compound selected from the class consisting of organophosphorus halides, phosphorus trihalides, alkyl phosphites and aryl phosphites to produce vinyl-containing phosphorus compounds in accordance with the following equation:

(4)     $nViMgCl + Vi_dR_aR'_bPX_{3-(d+a+b)} \rightarrow$
        $Vi_nR_aR'_bPX_{3-(n+a+b)} + MgClX$ wherein $n=1, 2,$ or $3$; $d=0, 1$ or $2$; $a$ and $b=0$ or $1$; $d+a+b$ may not be greater than 2; $n+a+b$ may not be greater than 3; Vi and X have the same significance ascribed to them above; R and R' are the same or different and have the same meaning given to them above. The following type compounds are the products included within the general formula for the vinylicphosphorus product above: $Vi_3P$, $Vi_2RP$, $Vi_2PX$, $ViRR'P$, $ViRPX$, $ViPX_2$. As illustrated in the foregoing Equation 4, the organophosphorus reactant may contain one or two vinylic groups bonded to the phosphorus atom. If so, said reactant was also made in accordance with the present process.

An aspect of the present process is illustrated in the following equation:

(5)     $nViMgCl + R_aR'_bPX_{3-(a+b)} \rightarrow$
        $Vi_nR_aR'_bPX_{3-(n+a+b)} + nMgClX$ wherein $n=1, 2,$ or $3$; $a$ and $b=0$ or $1$; the sum of $n+a+b$ being not greater than 3; the sum of $a+b$ may not be greater than 2; Vi and X have the same significance ascribed to them above; and R and R' are the same or different and have the same meaning ascribed to them above. The process may be so controlled that any of the aforementioned products or a mixture of products may be produced. It is also possible to carry out the reaction step-wise by first reacting a vinylicmagnesium chloride with an organophosphorus reactant as defined above not containing vinylic radicals or with phosphorus trihalide, an alkyl phosphite or an aryl phosphite and then further reacting the product of this reaction with a vinylicmagnesium chloride as is included in Equation 4 herein.

The novel vinylicphosphorus compounds may also be prepared by reacting a vinylic halide containing at least one vinylic group bonded to the phosphorus atom with an organomagnesium halide (preferably the chloride). Thus, diphenylvinylphosphine may be produced by reacting vinylphosphorus dichloride with phenylmagnesium chloride. Of course, the vinyl phosphorus halide utilized as a reactant is produced by the process of this invention, as illustrated in Equation 4. The use of this two-step procedure is advantageous in certain cases where it will result in mixtures of reaction products and reactants which are more easily separated than would be mixtures resulting from the one step process illustrated in Equation 4.

When the vinylicmagnesium chloride is reacted with the phosphorus reactant, the product may be any type compounds listed herein before (as products) or any mixture of them, dependent upon the reactants used, the relative proportions of the reactants used, and the process conditions. The reaction product will usually be a mixture of 2 or 3 of the above products. However, by control of the variables, it is possible to produce a product containing a preponderance of a desired reaction product. A single product may be obtained when using a monohalogen phosphorus, a mono-alkoxy or a mono-aryloxy phosphorus compound as reactant or a sufficient excess of ViMgCl with $PX_3$, $RPX_2$, $R_2PX$ to give $Vi_3P$, $Vi_2RP$ and $ViR_2P$, respectively.

The process is usually carried out by dissolving the phosphorus containing reactant in an organic solvent. In certain cases, this need not be done, e.g., vinylphosphorus dichloride can be prepared by adding vinylmagnesium chloride to an excess of phosphorus trichloride. Vinylic magnesium chloride (usually in a solution of cyclic ether, Q, more particularly hereinafter defined) is added to the solution of a phosphorus reactant preferably with agitation. A reaction will usually start immediately. If all of the halogen, alkoxy or aryloxy is to be replaced, the phosphorus reactant may be added to the vinylicmagnesium chloride solution. The reaction temperature will vary with the reactants and solvents utilized and the products desired and will usually be between room temperature and the reflux temperature of the reaction mixture. The reaction is usually exothermic. For special conditions, it may be necessary to carry the reaction out at low temperatures or under reduced pressures. The reaction is preferably carried out in an inert atmosphere, usually nitrogen. The reaction products include one or more of the vinylicphosphorus compounds and a magnesium halide salt cake which may be separated by conventional means, e.g., filtration, drowning in and extraction by acidified water, crystallization, etc. The solvents are usually removed by distillation. When the products include more than one vinylic phosphorus compound, they may be separated by conventional separatory techniques.

The vinylicmagnesium chlorides are prepared as disclosed in U.S. patent application No. 549,517, now abandoned.

Compound Q referred to above is a substituted or unsubstituted non-aromatic heterocyclic oxygen compound having from 5 to 6 atoms in the heterocyclic ring, and only one oxygen in said heterocyclic ring. The other ring atoms of said heterocyclic ring are carbon with the exception that a substituted ring nitrogen, substituted preferably with an alkyl radical, having up to 6 carbon atoms in the alkyl chain may replace a carbon atom in said heterocyclic ring which is not adjacent said oxygen atom in the ring. A further requirement for compound Q is that said heterocyclic ring is of a non-aromatic character, that is, that it does not contain a cyclic conjugated system of bonding within the heterocyclic ring. Preferably, said compound Q contains not more than one unsaturation between carbon atoms of said heterocyclic ring, which is an ethylenic unsaturation. A further requirement for compound Q is that it be unsubstituted, except for hydrogen, at least one carbon atom which is adjacent said oxygen atom in said heterocyclic ring.

The heterocyclic ring of compound Q may carry any substituents which are not reactive with the reactants and the reaction products, under the conditions of reaction, for the preparation of the vinylicmagnesium chloride. By way of illustration the following substituents may be mentioned: alkyl, aryl, alkoxy, aryloxy; —$CH_2OR''$ wherein $R''$ is alkyl, preferably having up to 6 carbon atoms or —$(CH_2—CH_2—O)_xR'''$ wherein $x$ is a whole number from 1 to 8 and $R'''$ is alkyl, preferably having up to 6 carbon atoms;

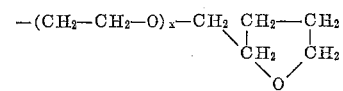

wherein $x$ is a whole number from 1 to 8; and

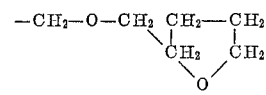

In a preferred form of this invention the substituents of said compound Q, aside from hydrogen, occur only at the number 2 position of said non-aromatic heterocyclic ring system and do not contain more than 75 atoms in the group.

Q may function as a solvent in this present process. If it is used as a solvent, a high melting point (e.g., about 90° C.) will cause difficulty in carrying out the reaction. For this reason it is advantageous to use a liquid Q, i.e., liquid below 90° C.

It will be noted from the above that an essential feature of the compound Q is that it be non-aromatic in character. Another essential feature of the compound Q is that it be free of substituents except for hydrogen, at at least one carbon atom which is adjacent the oxygen atom of the heterocyclic ring. These features are essential in order to make the three p-electrons on said oxygen atom available for coordination and complex formation with magnesium. The presence of substituents, aside from hydrogen, on both carbon atoms adjacent the oxygen atom of said heterocyclic ring restricts the availability of the free p-electrons of said oxygen for donation and complex formation, whereas a substituent on only one of said carbon atoms does not. The presence of substituents in other positions on the heterocyclic ring does not affect the availability of electrons on said oxygen for coordination and complex formation. The free p-electrons on oxygen atoms which constitute part of a heterocyclic ring system possessing aromatic characteristics are also not available for coordination and complex formation. The "aromaticity" of certain heterocyclic compounds is a well known phenomenon. This phenomenon is associated with the cyclic conjugated system of bonding which is characteristic of these heterocyclic compounds. Thus, furan, which is known to be aromatic in character, is not operative as a compound Q, whereas dihydropyran, which contains a single unsaturated bond is operative as a compound Q for the purposes of this invention. This is explained on the basis of the resonance of the respective compounds. Furan exhibits a p-pi *aromatic* resonance as a result of which the electron distribution is such that the free p-electrons of the oxygen atom are not available for coordination and complex formation. Dihydropyran, on the other hand exhibits only *an ethylenic* p-pi resonance in which the free p-electrons are still available for coordination and complex formation thus rendering it operative for the present purpose.

By way of illustration heterocyclic oxygen compounds included within the definition of compound Q are as follows: tetrahydrofuran, tetrahydropyran, 2-methyltetrahydrofuran, 2-ethoxytetrahydropyran, tetrahydrofurfuryl ethyl ether, dihydropyran, N-methylmorpholine, ditetrahydrofurfuryl ether and ethers of general formula

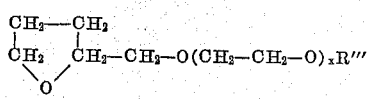

wherein R''' is an alkyl group having from 1 to 6 carbon atoms in the alkyl radical or the group

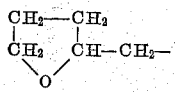

and $x$ is a whole number from 1 to 8.

In a preferred form of this invention the vinylicmagnesium chloride is employed in the form of a solution in compound Q. This is preferred since this reagent may be readily and economically prepared by the reaction of the vinylic chloride with magnesium in the presence of compound Q. The solutions thus prepared may be used as a reactant in the present process. However, the vinylicmagnesium chloride may also be used in the process of the present invention when dissolved in other solvents, e.g., ethylene polyethers. These solutions are prepared by the displacement of compound Q from solutions of the vinylicmagnesium chlorides-compound Q solutions by the above mentioned solvents. The vinylicmagnesium chloride may also be used in accordance with this invention in the form of a solution in a mixture of compound Q and an inert solvent.

The solvents utilized in the process must be inert to other components of the reaction mixture under the process conditions and are preferably organic solvents that distill below 150° C. The preferred solvents include substituted and unsubstituted tetrahydrofuran, tetrahydropyran, heptane, hexane, pentane, cyclohexane, octane, isooctane, cumene, xylene, toluene, benzene, etc. As noted above, a solvent system containing more than one component may also be used. A preferred solvent system is that containing tetrahydrofuran and a hydrocarbon solvent, e.g. saturated aliphatic, saturated cyclic aliphatic or aromatic solvent. Almost all of the reaction mixtures utilized will contain tetrahydrofuran or an equivalent material, designated as compound Q, complexed with the vinylcmagnesium chloride.

The following examples are further illustrative of the present invention. It is to be understood, however, that the invention is not destricted to the specific embodiments described herein in detail.

*Example 1.—Trivinylphosphorus*

In a 5 liter flask was placed 91.6 grams (0.667 mole) of phosphorus trichloride and 1 liter of pentane. To this was added 800 ml. of a vinylmagnesium chloride in tetrahydrofuran solution; the tetrahydrofuran solution containing 2.2 moles of vinylmagnesium chloride. During the first part of the addition the heat of reaction was sufficient to cause vigorous reflux. When about 2.5 equivalents of vinylmagnesium chloride (1.67 moles) had been added (2 hours of addition to this point) the reflux stopped. Addition was stopped and the reaction mixture caused to reflux for 1.5 hours. The additional vinylmagnesium chloride was then added with intermittent periods of reflux. The reaction mixture was allowed to stand overnight and then hydrolyzed, yielding an aqueous phase and a solid phase. The solid phase contained trivinylphosphorus (86.9% yield).

*Example 2.—Trivinylphosphorus*

To 2.6 moles of vinylmagnesium chloride in tetrahydrofuran was added dropwise and with good stirring 119.1 grams (0.867 mole) of phosphorous trichloride. The total addition took six hours. One liter of tetrahydrofuran was added during the course of the addition. After the addition was completed the reaction mixture was refluxed for three hours. The solution was filtered from the salt cake, and the salt returned to the flask and hydrolyzed. The resulting solution was decanted leaving a solid in the flask. An additional 500 ml. of water was added, and the solid was distributed in the aqueous phase, which was filtered by gravity overnight. The various solutions were flash distilled and analyzed and proved to contain no phosphorus. The solid material contained trivinylphosphorus.

*Example 3*

To one mole of butylphosphorus dischloride in pentane solution is slowly added two moles of vinylmagnesium chloride in tetrahydrofuran solution. After completion of the addition, the reaction mixture is refluxed, cooled, hydrolyzed and the organic material separated. Divinylbutylphosphorus is recovered from the organic material.

*Example 4*

To one mole of octadecylphosphorus dichloride in heptane solution is slowly added two moles of vinylmagnesium chloride in tetrahydropyran solution. After completion of the addition, the reaction mixture is refluxed, cooled, hydrolyzed and the organic material separated. Divinyloctadecylphosphorus is recovered from the organic material.

*Example 5*

To one mole of phenylphosphorus dichloride in heptane solution is slowly added two moles of vinylmagnesium chloride in tetrahydrofuran solution. After completion of the addition, the reaction mixture is refluxed, cooled, hydrolyzed and the organic material separated. Divinylphenylphosphorus is recovered from the organic material.

*Example 6*

To one mole of methylphosphorus dichloride in pentane solution is slowly added two moles of vinylmagnesium chloride in tetrahydrofuran solution. After completion of the addition, the reaction mixture is refluxed, cooled, hydrolyzed and the organic material separated. Divinylmethylphosphorus is recovered from the organic material.

*Example 7*

To one mole of diethylphosphorus chloride in heptane solution is slowly added one mole of vinylmagnesium chloride in 2-methyltetrahydrofuran solution. After completion of the addition, the reaction mixture is refluxed, cooled, hydrolyzed and the organic material separated. Vinyldiethylphosphorus is recovered from the organic material.

*Example 8*

To one mole of dilaurylphosphorus chloride in toluene solution is slowly added one mole of vinylmagnesium chloride in tetrahydrofurfuryl ethyl ether solution. After completion of the addition, the reaction mixture is refluxed, cooled, hydrolyzed and the organic material separated. Vinyldilaurylphosphorus is recovered from the organic material.

*Example 9*

To one mole of dibenzylphosphorus chloride in benzene solution is slowly added one mole of vinylmagnesium chloride in tetrahydrofuran solution. After completion of the addition, the reaction mixture is refluxed, cooled, hydrolyzed and the organic material separated. Vinyldibenzylphosphorus is recovered from the organic material.

*Example 10*

To one mole of thienylphosphorus dibromide in pentane solution is slowly added two moles of vinylmagnesium chloride in dihydropyran solution. After completion of the addition, the reaction mixture is refluxed, cooled, hydrolyzed and the organic material separated. Divinylthienylphosphorus is recovered from the organic material.

Example 11

To one mole of cyclopentamethylenephosphorus chloride in cyclohexane solution is added one mole of vinylmagnesium chloride in tetrahydrofuran. After completion of the addition, the reaction mixture is refluxed, cooled, hydrolyzed and the organic material separated. Vinylcyclopentamethylenephosphorus is recovered from the organic material.

Example 12

To one mole of 6-quinolylphosphorus dichloride in toluene is slowly added, at reflux, two moles of 1-propenyl magnesium chloride in tetrahydrofuran. The reaction mixture is additionally refluxed, then cooled, hydrolyzed and the organic material separated. Di(1-propenyl)6-quinolylphosphorus is recovered from the organic material.

Example 13

To one mole of phosphorus trichloride in hexane is added three moles of buten-2-ylmagnesium chloride in tetrahydrofuran solution. After completion of the addition, the reaction mixture is additionally refluxed, cooled, hydrolyzed and the organic matter separated. Tributen-2-ylphosphorus is recovered from the organic material.

Example 14

To one mole of m-fluorophenylphosphorus dichloride in benzene is slowly added two moles of 3-methyl-1-butenylmagnesium chloride in tetrahydrofuran solution, at reflux. After completion of the addition, the reaction mixture is refluxed, cooled, hydrolyzed and the organic matter separated. Di(3-methyl-1-butenyl)m-fluorophenylphosphorus is recovered from the organic material.

Example 15

To one mole of 5-methylthienylphosphorus dichloride in toluene is slowly added two moles of 1-penten-1-ylmagnesium chloride in tetrahydrofuran. After completion of the addition, the reaction mixture is refluxed, cooled, hydrolyzed and the organic material separated. Di(1-penten-1-ly)5-methylthienylphosphorus is recovered from the organic material.

Example 16

To one mole of phosphorus trichloride in heptane is slowly added two moles of vinylmagnesium chloride in tetrahydrofuran. The mixture is stirred until the reaction is completed and is then filtered. The solvents are removed from the filtrate by distillation. The residue is rapidly fractionally distilled to yield divinylphosphorus chloride.

Example 17

To one mole of phosphorus trichloride in heptane is slowly added one mole of vinylmagnesium chloride in tetrahydrofuran. The mixture is stirred until the reaction is completed and is then filtered. The solvents are removed from the filtrate by distillation. The residue is rapidly fractionally distilled to yield vinylphosphorus dichloride.

Example 19

To one mole of phenylphosphorus dichloride in benzene solution is slowly added one mole of vinylmagnesium chloride in tetrahydrofuran. The mixture is stirred until the reaction is completed and then filtered. The solvents are removed from the filtrate and the residue rapidly fractionally distilled to yield vinylphenylphosphorus chloride.

Example 20

To one mole of butylphosphorus dichloride in benzene solution is slowly added one mole of vinylmagnesium chloride in tetrahydrofuran. The mixture is stirred until the reaction is completed and is then filtered. The solvents are removed from the filtrate and the residue rapidly fractionally distilled to yield vinylbutylphosphorus chloride.

Example 21

To one mole of ethylphosphorus dichloride in cyclohexane solution is slowly added one mole of vinylmagnesium chloride in tetrahydrofuran. The mixture is stirred until the reaction is completed and is then filtered. The solvents are removed from the filtrate and the residue rapidly fractionally distilled to yield vinylethylphosphorus chloride.

Example 22

To one mole of methylphosphorus dichloride in heptane solution is slowly added one mole of vinylmagnesium chloride in tetrahydrofuran. The mixture is stirred until the reaction is completed and is then filtered. The solvents are removed from the filtrate and the residue rapidly fractionally distilled to yield vinylmethylphosphorus chloride.

Example 23.—Tris 1-Cyclohexenyl-Phosphorus

Four (4) moles of the Grignard reagent prepared from 1 cyclohexenyl chloride and magnesium in tetrahydrofuran is slowly added to one mole of $PCl_3$ in heptane. Water is added to dissolve the $MgCl_2$ product. The organic layer is separated, filtered and solvents are removed by distillation. The product is purified by recrystallization from xylene.

Example 24.—Trivinylphosphorus $(CH_2\!\!=\!\!CH)_3P$

To three (3) moles of vinylmagnesium chloride in tetrahydrofuran, maintained at 10° C., is added one mole of trimethyl phosphite in tetrahydrofuran and the mixture permitted to stir at 20° C. for 2 hours. Then the product is decomposed by adding acidified (HCl) water to the reaction mixture. The organic layer is separated, washed with water and dried over calcium chloride. After removal of the solvent, trivinylphosphorus is obtained in 87% yield.

Example 25.—Trivinylphosphorus $(CH_2\!\!=\!\!CH)_3P$

To one (1) mole of triphenyl phosphite in tetrahydrofuran is added 3 moles of separately prepared vinylmagnesium chloride in tetrahydrofuran at room temperature. As soon as the addition is complete, acidified (HCl) water is added. Two layers form and the organic layer is removed and washed twice with alkaline water and then twice with water to remove the phenol dissolved in the organic layer. The organic residue is dried over calcium chloride and the solvent then removed to yield pure trivinylphosphorus (87% yield).

The vinylicphosphorous compounds of this invention are useful as fuel additives. They are polyfunctional and are active as cross-linking agents. They may be polymerized with such compounds as styrene, vinyl acetate, vinyl chloride, butadiene, acrylates, esters, acrylics, and other vinylated metals such as vinyltins, vinylborons, vinylsilanes, vinylarsenics, and vinyl antimony to yield polymers having a high metal or metalloid content which may be used in the plastic fabricating industries as well as in other industries.

Throughout the application the vinylicmagnesium chlorides have been designated as such. When the magnesium chloride compounds are prepared in the presence of compound Q, defined herein, the vinylicmagnesium chloride compounds may take the form of a complex with compound Q, ViMgCl.nQ, wherein Vi and Q are as defined above and $n$ is a small indeterminate whole number in the order of 1, 2 or 3.

While the invention has been described with particular reference to specific embodiments, it is to be understood that it is not limited thereto but is to be construed broadly and restricted solely by the scope of the appended claims.

What is claimed is:
1. Trivinylphosphine.
2. A process for preparing vinylphosphorus compounds which comprises reacting vinylmagnesium chloride having the formula $CH_2=CH-MgCl$, with a phosphorus reactant having the formula $R_aPX_{3-a}$, wherein R is a hydrocarbon radical, X is a radical selected from the class consisting of halogen, alkoxy and aryloxy radicals, and $a$ is a number from 0 to 2; said reaction being carried out in the presence of a cyclic ether containing from 5 to 6 atoms in the ring, and wherein (a) there is only one oxygen atom in the ring, (b) the other ring atoms are carbon, (c) one ring carbon separated from the oxygen atom in the ring by two carbon atoms may be replaced by an alkyl-substituted nitrogen atom, (d) the ring contains not more than one double bond, (e) at least one carbon atom adjacent the oxygen atom in the said ring being free of any substituents other than hydrogen, (f) said ether contains no substituent which reacts with an organomagnesium chloride.
3. The process of claim 2 wherein the cyclic ether is selected from the class consisting of tetrahydrofuran, tetrahydropyran, 2-methyltetrahydrofuran, tetrahydrofurfuryl ethyl ether, 2-ethoxytetrahydropyran, dihydropyran, and N-methylmorpholine.
4. The process of claim 3 wherein the hydrocarbon radical (R) of the phosphorus reactant has up to 18 carbon atoms.
5. A process according to claim 4 wherein the cyclic ether is tetrahydrofuran.
6. The process of claim 3 wherein $a$ is 0.
7. A process according to claim 6 wherein the cyclic ether is tetrahydrofuran.
8. The process of claim 6 wherein X is chlorine.
9. Trivalent phosphorus compounds of the general formula

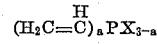

wherein X is a halogen, and $a$ is a number from 1 to 3.
10. The compounds of claim 9 wherein $a$ is 1.
11. The compounds of claim 9 wherein $a$ is 2.
12. The compounds of claim 9 wherein X is chlorine.
13. Divinylphosphorus chloride.
14. Vinylphosphorus dichloride.

References Cited in the file of this patent

UNITED STATES PATENTS

| | | |
|---|---|---|
| 2,489,091 | Kharasch | Nov. 22, 1949 |
| 2,642,461 | Morris et al. | June 16, 1953 |
| 2,803,597 | Stiles | Aug. 20, 1957 |
| 2,912,465 | Ramsden | Nov. 10, 1959 |
| 2,916,518 | Burg et al. | Dec. 8, 1959 |
| 2,957,931 | Hamilton et al. | Oct. 25, 1960 |

OTHER REFERENCES

The Van Nostrand Chemist's Dictionary, D. Van Nostrand Co., Inc., New York, 1953, p. 359.

Jones et al.: J. Chem. Soc. (London), 1947, pp. 1446–9.

Kharasch et al.: Grignard Reactions of Nonmetallic Substances, Prentice-Hall, New York, 1954, pp. 49, 54, 55, 1339 to 1343.

Kosolapoff: Organophosphorus Compounds, John Wiley & Sons, Inc., New York, 1950, pp. 16 and 17.

Walsh et al.: Journ. Am. Chem. Soc., vol. 77, 1955, pp. 929–931.

Beil.: Handbuch der Org. Chem., vol. IV, 4th ed., 1922, page 589.